(Model.)

J. H. ROUSE.
CLUTCH FOR SLIDING JOINTS.

No. 346,867. Patented Aug. 3, 1886.

Witnesses,
John F. C. Prinkert
Fred L. Emery

Inventor
John H. Rouse.
By Crosby & Gregory, attys

UNITED STATES PATENT OFFICE.

JOHN H. ROUSE, OF MALDEN, ASSIGNOR TO J. CHARLES HOLLINGS, OF BOSTON, MASSACHUSETTS.

CLUTCH FOR SLIDING JOINTS.

SPECIFICATION forming part of Letters Patent No. 346,867, dated August 3, 1886.

Application filed March 18, 1886. Serial No. 195,686. (Model.)

*To all whom it may concern:*

Be it known that I, JOHN H. ROUSE, of Malden, county of Middlesex, and State of Massachusetts, have invented an Improvement in Clutches or Sliding Joints, of which the following description, in connection with the accompanying drawings, is a specification, like letters on the drawings representing like parts.

This invention has for its object to provide a simple and efficient clutch or sliding joint, whereby the relative positions of a pipe or rod and a sleeve, tube, or collar thereon may be readily changed with relation each to the other and remain in the position in which they are left until it is again desired to place them in another position.

My improved clutch is especially adapted for use in connection with pipes or rods arranged in what may be called "telescopic sections," in order that the parts may at times be more or less elongated, or in order that a sleeve or collar supporting a weight may be left at different positions upon a rod or tube, considering it as a standard.

My improved clutch or joint is especially applicable in connection with fixtures for gas or other illumination.

My invention consists, essentially, in a rod or tube, a surrounding sleeve or collar, and an attached braided-wire tube, the latter when elongated being contracted to clutch the rod or tube snugly, but when compressed in the direction of its length being expanded in diameter to run loosely upon the said rod or tube.

Figure 1:
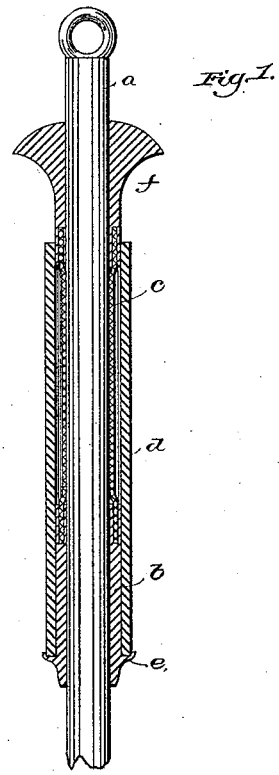
Figure 2:
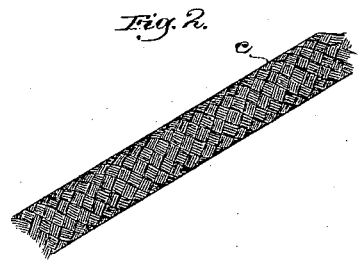
Figure 3:

Figure 1, in vertical section, represents by full lines a sufficient portion of a clutch to illustrate one practical embodiment of my invention. Fig. 2, in perspective, shows a piece of braided tubing composed, preferably, of wire; and Fig. 3 is a modification of my invention, showing a double-acting clutch with the rod in horizontal position.

Referring to the drawings, let *a* represent a rod, or it may be a tube cylindrical in cross-section, the said rod or tube being considered as fixed, or as not movable longitudinally. Surrounding this rod or tube *a* is a sleeve or collar, *b*, which, it may be assumed, will have attached to it a weight, which is to be supported by the clutch, such weight being, for instance, the brackets or arms of a fixture for use in connection with gas or other illumination, or for sustaining any article, as I do not intend to limit my invention to its use in connection with any particular class of mechanical contrivances. To this sleeve *b* is attached, by solder or otherwise, one end of a braided-wire tube, *c*, the said tube *c* surrounding the rod *a*, the other end of the said tube being terminated by a head, *f*, of any suitable shape, the purpose of the said head being essentially to constitute a finish for the other end of the wire tube, and form a suitable surface to be pressed upon by the hand of the person operating the clutch. The weight to be sustained by the clutch is applied to the sleeve *b*, the connection being in any suitable manner. Preferably I shall conceal the braided tube from sight, as shown in Fig. 1 of the drawings, by means of an independent tube, *d*, the latter, as herein shown, being supported by a shoulder, *e*, on the sleeve or collar *b*, and, if desired, the weight to be sustained by the clutch may be connected directly with the tube *d*. The weight, however applied, by pulling upon and elongating tube contracts it in diameter, so that the inner surface of the said tube fits the rod *a* snugly. The greater the longitudinal strain upon the braided tube the closer its fit to the rod, and vice versa, within, of course, certain limits, measured by the tensile strength of the wire composing the tube.

In operation it will be readily understood that the movement of the head *f* toward the collar *c* will shorten the braided tube and cause it to relax its pressure upon the rod *a*, and at such time the sleeve *b*, and whatever may be attached to or upon it, may be readily moved upon the rod; but the moment that pressure is relaxed from the head *f* the inherent elasticity of the braided tube causes it to elongate, so that the inner side of the said tube *c* comes against the rod *a* and clings to it, the weight represented by the sleeve *b* and its attached parts thrown upon the said tube *c* causing it to bind closer and closer to the rod, the fit being so close as to sustain the sleeve *b* and its attached parts upon or with relation to the rod wherever the said sleeve may be left when pressure is removed from the head *f*.

I do not intend to limit my invention to making the collar *b* of the particular shape herein shown, for it is obvious in the application of my improved clutch to various mechanisms and uses in the mechanic arts that the form of the sleeve or collar *b* connected with the braided tube, and which attached to it serves to elongate the said tube, may be variously modified without departing from my invention.

This device may be made serviceable to hold carbons in electric lights.

In fact, my improved clutch may be used in most any position wherein a set-screw is employed to hold a sleeve or collar in position on a rod or tube, the braided tube serving the usual purpose of the set-screw.

In the drawings, Fig. 3, I have shown a braided tube as attached to both ends of the sleeve *b*, and in such application it will be impossible to move the said collar on the rod *a* without first compressing both tubes in the direction of their length.

In Fig. 1 the collar *b* may be lifted but not depressed without pressure upon the head *f*.

If the clutch is to be employed upon a rod, *a*, placed horizontally, or if strain were to be exerted upon the collar *b* first in one and then in the opposite direction, two tubes, *c*, one at each end of the collar *b*, would be needed.

I claim—

1. As an improved clutch, a rod or tube, *a*, combined with a surrounding braided tube and a sleeve or collar attached to one end of the said braided tube, to operate substantially as described.

2. The rod or tube and the surrounding braided-wire tube, combined with two sleeves or collars attached to or co-operating with the opposite ends of the said braided tube, the said devices operating to form a readily-movable clutch, substantially as described.

In testimony whereof I have signed my name to this specification in the presence of two subscribing witnesses.

JOHN H. ROUSE.

Witnesses:
G. W. GREGORY,
C. M. CONE.